US009923179B2

(12) United States Patent
Maguire

(10) Patent No.: US 9,923,179 B2
(45) Date of Patent: Mar. 20, 2018

(54) BATTERY ASSEMBLY WITH BIASED COMPONENT PROFILES TO PROMOTE BATTERY CELL TO HEAT EXCHANGER CONTACT

(71) Applicant: FORD GLOBAL TECHNOLOGIES, LLC, Dearborn, MI (US)

(72) Inventor: Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 22 days.

(21) Appl. No.: 14/800,124

(22) Filed: Jul. 15, 2015

(65) Prior Publication Data

US 2017/0018824 A1    Jan. 19, 2017

(51) Int. Cl.
| | |
|---|---|
| *H01M 10/04* | (2006.01) |
| *H01M 10/6551* | (2014.01) |
| *H01M 2/10* | (2006.01) |
| *H01M 10/6554* | (2014.01) |
| *H01M 10/613* | (2014.01) |
| H01M 10/647 | (2014.01) |

(52) U.S. Cl.
CPC ..... *H01M 2/1077* (2013.01); *H01M 10/0481* (2013.01); *H01M 10/613* (2015.04); *H01M 10/6554* (2015.04); *H01M 10/647* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,640,455 B2 | 2/2014 | Pinto, IV et al. | |
| 8,883,342 B2 | 11/2014 | Buck et al. | |
| 2011/0064985 A1 | 3/2011 | Lee et al. | |
| 2011/0104532 A1 | 5/2011 | Buck et al. | |
| 2011/0262799 A1* | 10/2011 | Kim | H01M 2/1077 429/156 |
| 2013/0309545 A1* | 11/2013 | Daubitzer | H01M 2/1072 429/120 |
| 2015/0037647 A1 | 2/2015 | Nguyen et al. | |

FOREIGN PATENT DOCUMENTS

| | | | |
|---|---|---|---|
| CN | 101682087 | 3/2010 | |
| EP | 2337142 B1 * | 6/2011 | ............ B60L 3/0046 |
| KR | 20060134549 A | 12/2006 | |
| KR | 20120004321 A | 1/2012 | |
| WO | 2014/014285 A1 | 1/2014 | |

* cited by examiner

*Primary Examiner* — Sarah A. Slifka
*Assistant Examiner* — Haroon S. Sheikh
(74) *Attorney, Agent, or Firm* — Carlson, Gaskey & Olds

(57) ABSTRACT

A battery assembly according to an exemplary aspect of the present disclosure includes, among other things, a cell stack and an array structure. At least one of the cell stack and the array structure includes a biased profile configured to bias the cell stack and a portion of the array structure together.

9 Claims, 4 Drawing Sheets

BATTERY ASSEMBLY WITH BIASED COMPONENT PROFILES TO PROMOTE BATTERY CELL TO HEAT EXCHANGER CONTACT

TECHNICAL FIELD

This disclosure relates to a battery assembly for an electrified vehicle. The battery assembly includes one or more components having biased profiles configured to bias a cell stack into contact with a heat exchanger, such as a cold plate.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

High voltage battery assemblies are employed to power the electric machines of electrified vehicles. Battery assemblies include cell stacks constructed of a plurality of battery cells. An array structure binds and/or houses the battery cells. A heat exchanger, such as a cold plate, may be positioned relative to the battery cells for thermally managing the heat generated by the cells.

SUMMARY

A battery assembly according to an exemplary aspect of the present disclosure includes, among other things, a cell stack and an array structure. At least one of the cell stack and the array structure includes a biased profile configured to bias the cell stack and a portion of the array structure together.

In a further non-limiting embodiment of the foregoing battery assembly, the cell stack includes a plurality of battery cells disposed side-by-side between opposing end plates.

In a further non-limiting embodiment of either of the foregoing battery assemblies, the portion of the array structure includes a heat exchanger configured as a cold plate.

In a further non-limiting embodiment of any of the foregoing battery assemblies, the array structure includes at least one of a tensile member, a tray, a cover and a heat exchanger.

In a further non-limiting embodiment of any of the foregoing battery assemblies, the cell stack includes the biased profile, the biased profile configured such that a first portion of a plurality of battery cells of the cell stack slide or bend relative to a second portion of the plurality of battery cells.

In a further non-limiting embodiment of any of the foregoing battery assemblies, the portion of the array structure is a heat exchanger that includes the biased profile, the biased profile including an arched shape.

In a further non-limiting embodiment of any of the foregoing battery assemblies, the arched shape is curved toward the cell stack in its unloaded position.

In a further non-limiting embodiment of any of the foregoing battery assemblies, the array structure includes the biased profile, the biased profile including an arched shape.

In a further non-limiting embodiment of any of the foregoing battery assemblies, the arched shape is curved toward the cell stack in its unloaded position.

In a further non-limiting embodiment of any of the foregoing battery assemblies, a heat exchanger is positioned on a first side of the cell stack and a tensile member of the array structure is positioned on a second side of the cell stack.

In a further non-limiting embodiment of any of the foregoing battery assemblies, a heat exchanger is positioned between a tray of the array structure and the cell stack.

In a further non-limiting embodiment of any of the foregoing battery assemblies, the biased profile is configured to move one of the cell stack and the portion of the array structure toward the other of the cell stack and the portion of the array structure.

In a further non-limiting embodiment of any of the foregoing battery assemblies, the biased profile biases at least two battery cells of the cell stack into contact with the portion.

In a further non-limiting embodiment of any of the foregoing battery assemblies, the array structure includes a tray and a cover.

In a further non-limiting embodiment of any of the foregoing battery assemblies, the tray includes the biased profile and the cover includes a second biased profile, the biased profile and the second biased profile cooperating to bias the cell stack and the portion together.

A method according to another exemplary aspect of the present disclosure includes, among other things, configuring at least one component of a battery assembly to include a biased profile. The battery assembly includes at least a cell stack and a heat exchanger. The cell stack and the heat exchanger are biased into contact with one another.

In a further non-limiting embodiment of the foregoing method, a tray of the battery assembly includes the biased profile. The biasing step includes positioning the heat exchanger and the cell stack on top of the tray such that initial contact with the tray is made near a mid-span of the cell stack and the heat exchanger. Contact between the heat exchanger and peripheral portions of the cell stack is progressively developed as the heat exchanger is moved further into contact with the tray.

In a further non-limiting embodiment of either of the foregoing methods, the heat exchanger includes the biased profile. The biasing step includes positioning the cell stack on top of the heat exchanger such that initial contact with the heat exchanger is made near a mid-span of the cell stack. Contact between the heat exchanger and peripheral portions of the cell stack is progressively developed as the heat exchanger is moved into contact with a tray of the battery assembly.

In a further non-limiting embodiment of any of the foregoing methods, a tensile member of the battery assembly includes the biased profile and the biasing step includes pushing the cell stack toward the heat exchanger using the biased profile.

In a further non-limiting embodiment of any of the foregoing methods, the cell stack includes the biased profile. The biasing step includes displacing a first portion of the cell stack relative to a second portion of the cell stack such that initial contact with the heat exchanger is made near a mid-span of the cell stack. The method further includes progressively loading the second portion of the cell stack against the heat exchanger as the cell stack is forced against the heat exchanger.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may include a cell stack, a heat exchanger and an array structure. At least one of the cell stack, the heat exchanger and the array structure includes a component having a biased profile configured to bias the cell stack into contact with the heat exchanger. In some embodiments, the biased profile includes an arched or crowned shape, although other shapes are also contemplated within the scope of this disclosure. The biased component profiles promote improved battery cell to heat exchanger contact across the entire length of the cell stack to achieve a desired level of thermal conductivity between the cells and the heat exchanger. These and other features are discussed in greater detail in the following paragraphs of this detailed description.

Figure 1:
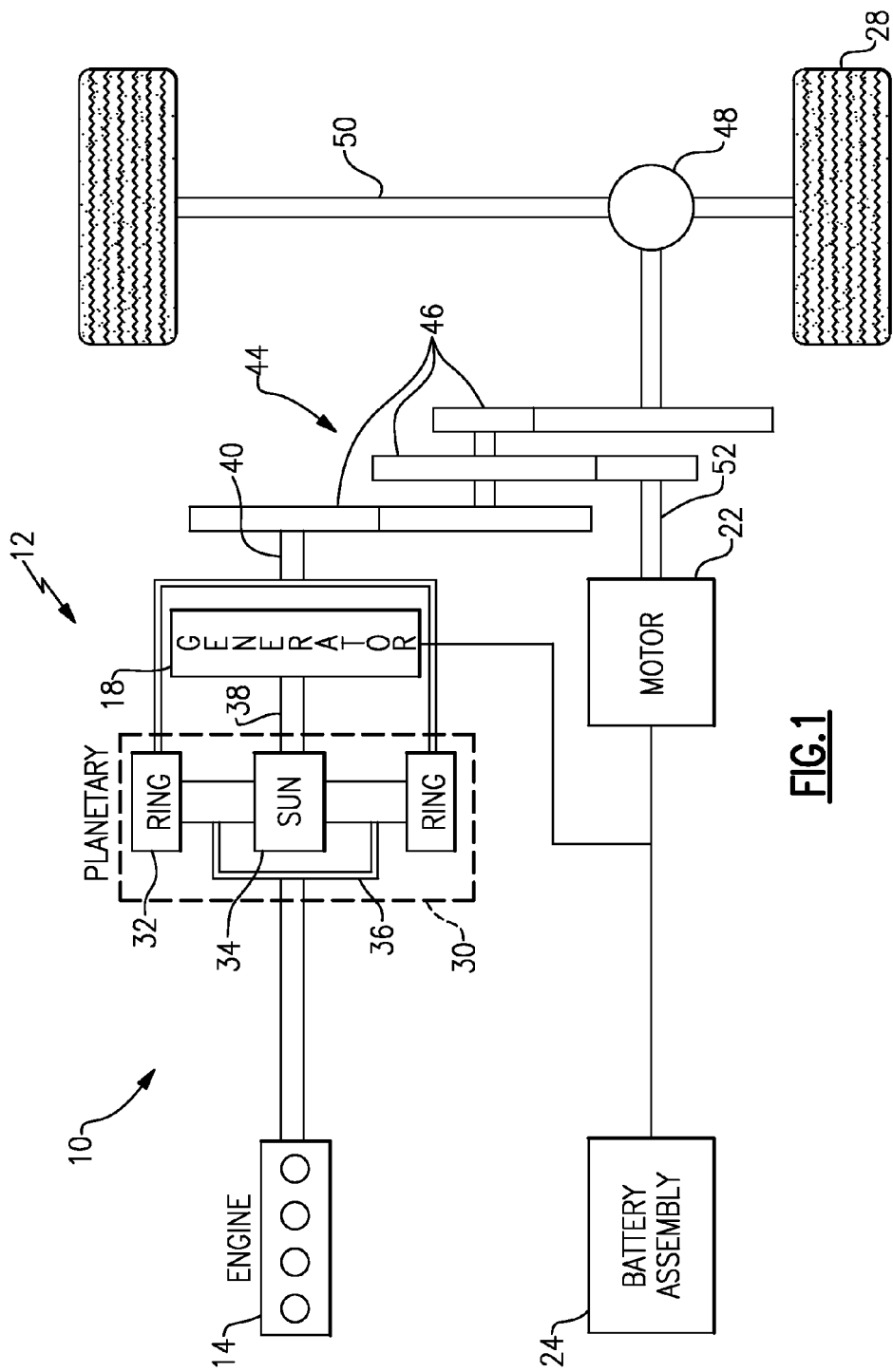
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery cells capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
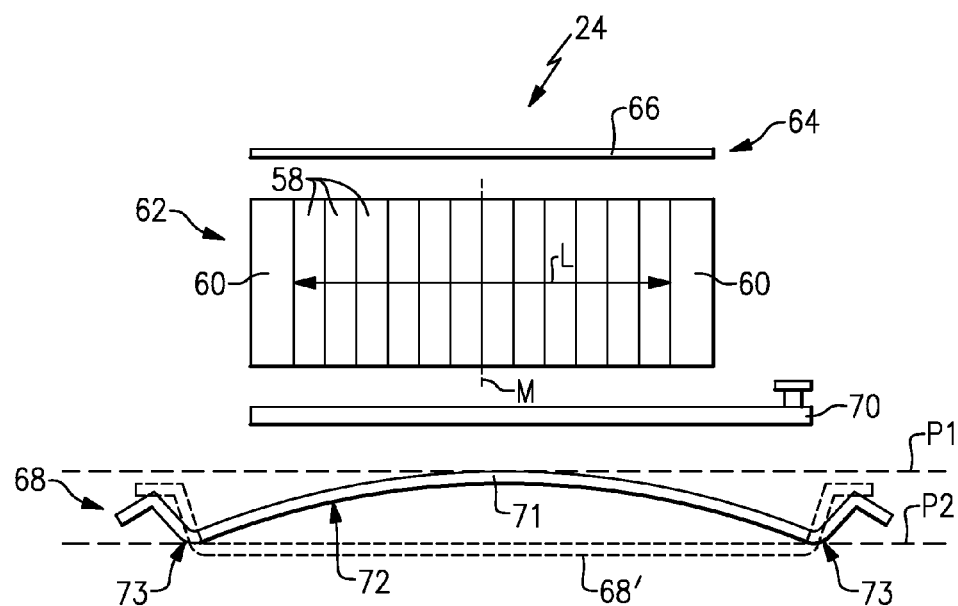
FIG. 2 illustrates a battery assembly according to a first embodiment of this disclosure.

FIG. 2 is an exploded view of a battery assembly 24 that could be employed within an electrified vehicle. For example, the battery assembly 24 could be employed within the electrified vehicle 12 of FIG. 1. The battery assembly 24 includes a plurality of battery cells 58 for supplying electrical power to various components of the electrified vehicle 12. Although a specific number of battery cells 58 are illustrated in FIG. 2, the battery assembly 24 could include a greater or fewer number of cells within the scope of this disclosure. In other words, this disclosure is not limited to the specific configuration shown in FIG. 1.

The battery cells 58 may be stacked side-by-side between opposing end plates 60 to construct a cell stack 62 (i.e., a grouping of battery cells). The end plates 60 cooperate to apply an axial compressive force to the battery cells 58 of the cell stack 62. In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The battery assembly 24 may additionally include an array structure 64 for bounding, housing and/or surrounding the cell stack 62. The array structure 64 may include various components including tensile members, binding members, enclosure members (e.g., cover and tray), heat exchangers (e.g., cold plates) etc. In the non-limiting embodiment of FIG. 2, the array structure 64 includes a cover 66 and a tray 68. Although not shown, other components may make up the array structure 64.

Heat may be generated by the battery cells 58 during charging and discharging operations. Heat may also be transferred into or out of the battery cells 58 due to relative temperature differences between the battery cells 58 and ambient conditions. A heat exchanger 70 may therefore be utilized to thermally condition (i.e., heat or cool) the battery cells 58 via thermal conduction. In one embodiment, the heat exchanger 70 is configured as a cold plate that is positioned between the cell stack 62 and the tray 68. In another embodiment, the functions of the heat exchanger 70 and the tray 68 may be achieved by a single component. Other configurations are also contemplated.

One or more components of the battery assembly 24 may include a biased profile that promotes contact between the battery cells 58 and the heat exchanger 70 along a portion of a length L or the entire length L of the cell stack 62. In one non-limiting embodiment, the tray 68 includes a biased profile 72 configured to bias the cell stack 62 and the heat exchanger 70 into contact with one another. The biased profile 72 may include an arched shape in its unloaded position. For example, the tray 68 may be curved in a direction toward the heat exchanger 70 such that a middle portion 71 of the tray 68 extends in a plane P1. The Plane P1 is above a plane P2 that extends through peripheral portions 73 of the tray 68.

During assembly of the battery assembly 24, the heat exchanger 70 and the cell stack 62 are placed on top of the tray 68 such that initial contact with the tray 68 is made near a mid-span M of the cell stack 62. Battery cell 58 to heat exchanger 70 contact is progressively developed extending outwardly toward the end plates 60 of the cell stack 62 until the end plates 60 contact the heat exchanger 70 (or contact the tray 68). Alternatively, initial contact between the cell stack 62 and the tray 68 may be made near one of the end plates 60 and then progressively developed from the end plate 60 toward the opposite end plate 60.

Figure 7:
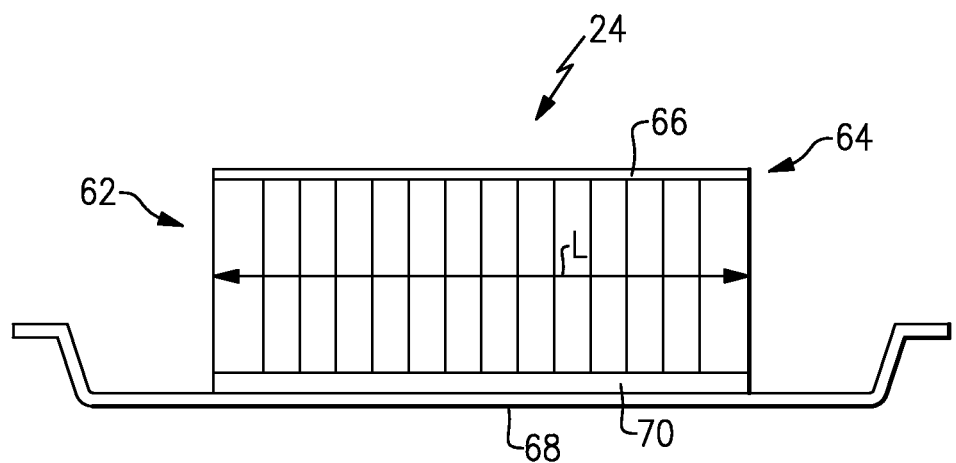
FIG. 7 illustrates an assembled battery assembly.

Once fully loaded as shown in phantom lines 68', the tray 68 may no longer exhibit the biased profile 72. The battery assembly 24 may then be fastened together using any known manner. In this embodiment, the tray 68 acts as a leaf spring that is biased into the heat exchanger 70 to move the heat exchanger 70 into contact with the battery cells 58 of the cell stack 62 along two or more cells in the length L of the cell stack 62. A view of the battery assembly 24 after loading the tray 68 is shown in FIG. 7.

In another non-limiting embodiment, it may be desirable to have a non-uniform load across the span of the cell stack 62 (i.e., high spring load near the mid-span M and moderate spring load near the end plates 60). Non-uniform loading can be developed by thickening the loading element (in this example, the tray 68), by adding tailored patches/blanks (additional layers of bonded material), by adding ribs, by stamping beads/darts or otherwise increasing the cross section area moment of inertia, or by varying the material properties of either the loading element or the response element (i.e., the components that are loaded by the loading element and exert a responsive force back onto the loading element). These are non-limiting examples of how non-uniform loading could be achieved.

Figure 3:
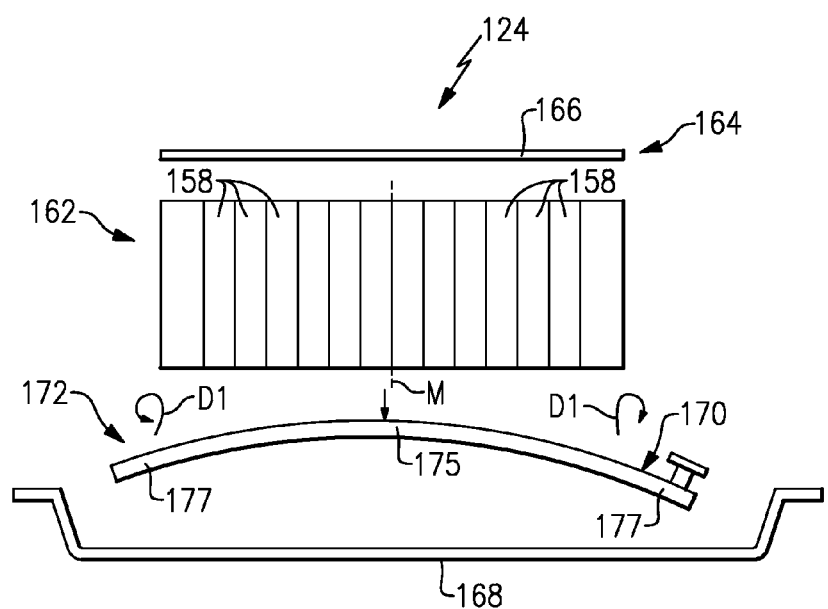
FIG. 3 illustrates a battery assembly according to a second embodiment of this disclosure.

FIG. 3 is an exploded view of another battery assembly 124. In this disclosure, like reference numbers designate like elements where appropriate and reference numerals with the addition of 100 or multiples thereof designate modified elements that are understood to incorporate the same features and benefits of the corresponding original elements. The battery assembly 124 may include a cell stack 162, a heat exchanger 170 and an array structure 164 including a cover 166 and a tray 168.

The battery assembly 124 of FIG. 3 is similar to the battery assembly 24 of FIG. 2 except that, in this embodiment, the heat exchanger 170 provides the biased profile 172 instead of the tray 168. The biased profile 172 of the heat exchanger 170 includes an arched shape that is curved in a direction toward the cell stack 162. For example, the heat exchanger 170 may be curved in a direction toward the cell stack 162 such that a middle portion 175 of the heat exchanger 170 extends outwardly of peripheral portions 177 of the heat exchanger 170.

During assembly of the battery assembly 124, the cell stack 162 is placed on top of the heat exchanger 170 such that initial contact with the heat exchanger 170 is made near a mid-span M of the cell stack 162. Battery cell 158 to heat exchanger 170 contact is progressively developed outwardly toward the ends of the cell stack 162 as the heat exchanger 170 is moved into contact with the tray 168, thereby causing the peripheral portions 177 to flex outwardly in a direction of arrows D1 toward the cell stack 162. The battery assembly 124 may then be fastened together in any known manner. In this embodiment, the heat exchanger 170 acts as a leaf spring for biasing the heat exchanger 170 into contact with the cell stack 162.

Figure 4:
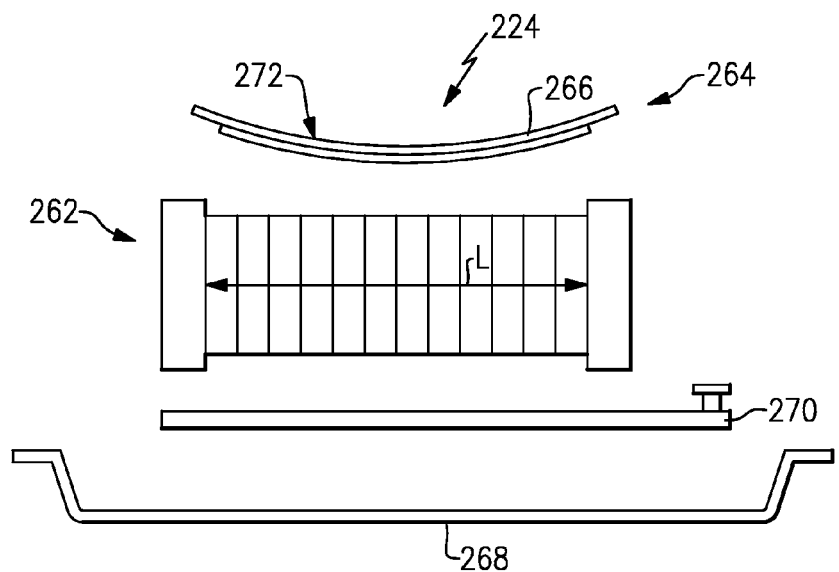
FIG. 4 illustrates a battery assembly according to another embodiment of this disclosure.

FIG. 4 illustrates another battery assembly 224. The battery assembly 224 may include a cell stack 262, a heat exchanger 270 and an array structure 264 including a tensile member 266 and a tray 268. In some non-limiting embodiments, the tensile member 266 may be configured as either a binding member or a wall positioned at least partly over the cell stack 262.

The tensile member 266 may include a biased profile 272. The biased profile 272 includes an arched shape that is curved in a direction toward the cell stack 262. The arched shape of the tensile member 266 pushes the cells stack 262 toward the heat exchanger 270 during assembly to promote improved contact across at least two cells within the length L of the cell stack 262.

Figure 5:
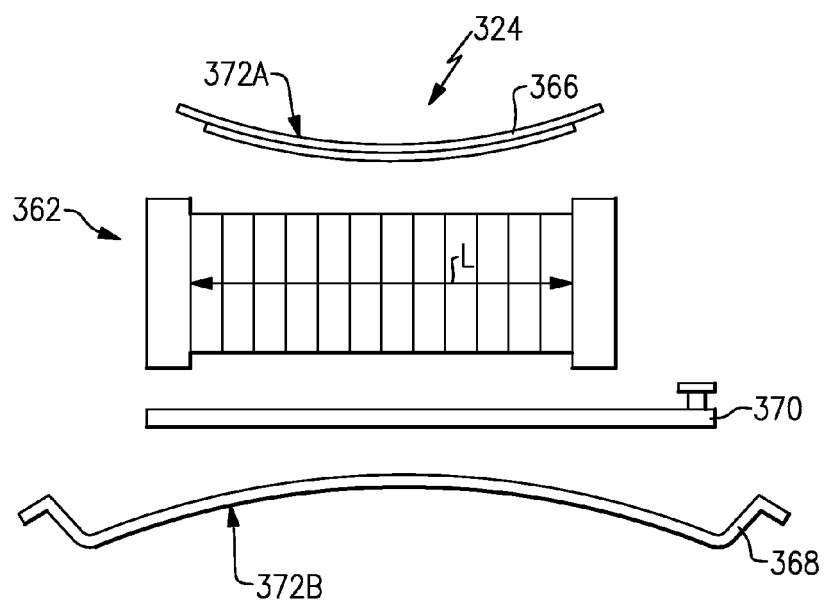
FIG. 5 illustrates a battery assembly according to yet another embodiment of this disclosure.

FIG. 5 is an exploded view of yet another battery assembly 324. In this embodiment, a tensile member 366 of the battery assembly 324 includes a first biased profile 372A and a tray 368 of the battery assembly 324 includes a second biased profile 372B. The first and second biased profiles 372A, 372B may be the same or different biased profiles. The first and second biased profiles 372A, 372B promote contact between the cell stack 362 and the heat exchanger 370 across at least two cells within the length L of the cell stack 362.

Figure 6:
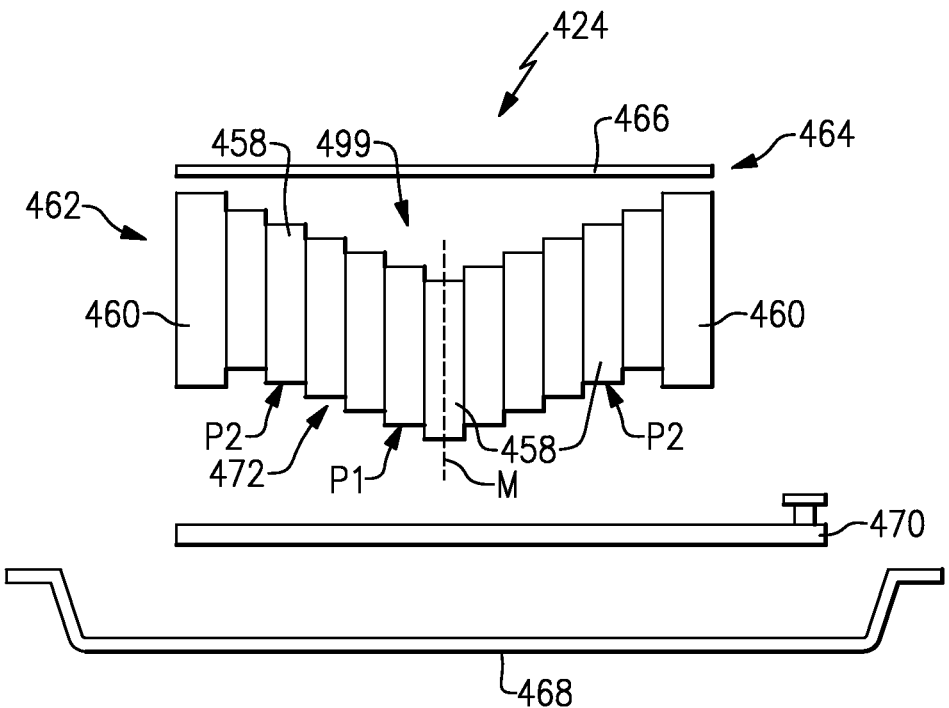
FIG. 6 illustrates a battery assembly according to yet another embodiment of this disclosure.

FIG. 6 illustrates yet another exemplary battery assembly 424. The battery assembly 424 may include a cell stack 462, a heat exchanger 470 and an array structure 464. The array structure 464 may include a cover 466 and a tray 468.

In this non-limiting embodiment, the cell stack 462 is adapted to include a biased profile 472. The biased profile 472 may be achieved by displacing the battery cells 458 of the cell stack 462 relative to one another to form a depression 499 on the side of the cell stack 462 closest to the cover 466. For example, a first portion P1 of the battery cells 458 near a mid-span M of the cell stack 462 may be displaced or moved relative to a second portion P2 of the battery cells 458 near end plates 460 of the cell stack 462. Displacement of the battery cells 458 in this manner configures the cell stack 462 in a chevron shape. Other shapes such as a curve or parabola may alternatively be employed which would result in variations in the initial cell to cell displacement. Furthermore, some battery cells 458 may intentionally not be displaced with respect to their neighboring battery cells 458 in order to influence the degree of contact developed between various battery cells 458 and the tray 468 or heat exchanger 470. In another non-limiting embodiment, one or more battery cells 458 may be displaced relative to other battery cells 458 of the cell stack 462 after pushing the battery cells 458 into good contact with the tray 468 or heat exchanger 470.

The first portion P1 of the battery cells 458 may be displaced in a direction toward the tray 468 (and the heat exchanger 470). This causes the battery cells 458 near the mid-span M to contact the heat exchanger 470 first and progressively load the rest of the battery cells 458 against the heat exchanger 470 as the entire cell stack 462 is forced to be seated against the heat exchanger 470 and/or the tray 468. The contact between the cell stack 462 and the heat exchanger 470 may be the result of the heat exchanger 470 and the tray 468 bending to conform about the arch of the battery cells 458, or alternatively or additionally may be the result of the battery cells 458 slipping with respect to one another such that the battery cells 458 near the mid-span M slide upwardly with respect to neighboring battery cells 458 until the neighboring battery cells 458 also make contact with the heat exchanger 470, and so on. Alternatively, the cell stack 462 may bend rather than slip to approach a flat geometry in contact with the heat exchanger 470.

The exploded views of FIGS. 2-6 are not necessarily drawn to scale and may be somewhat exaggerated to better illustrate the salient features of this disclosure. Multiple "biased profiles" such as shown in these figures may be combined with one another to achieve a desired amount of contact between the battery cells and the heat exchanger of a battery assembly. The shapes of the biased profiles may be curved, chevron, or other shapes as needed depending on the differences in stiffness between the various components of the battery assembly. For example, biased profiles may not be uniformly curved such as shown in FIGS. 2-6 and could be constructed to provide different degrees of curves and flatness at different portions along the length of the component having the biased profile.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
   a cell stack;
   an array structure that includes at least a tray, a cover, and a heat exchanger; and
   said cell stack including a biased profile that includes an arched shape in its unloaded position, said biased profile configured to bias said cell stack and a portion of said array structure together, wherein said biased profile is configured such that a first portion of a plurality of battery cells of said cell stack slide or bend relative to a second portion of said plurality of battery cells.

2. The battery assembly as recited in claim 1, wherein said plurality of battery cells are disposed side-by-side between opposing end plates.

3. The battery assembly as recited in claim 1, wherein said portion of said array structure is said heat exchanger, and said heat exchanger is configured as a cold plate.

4. The battery assembly as recited in claim 1, wherein said heat exchanger is positioned on a first side of said cell stack and a tensile member of said array structure is positioned on a second side of said cell stack.

5. The battery assembly as recited in claim 1, wherein said heat exchanger is positioned between said tray of said array structure and said cell stack.

6. The battery assembly as recited in claim 1, wherein said biased profile is configured to move one of said cell stack and said portion of said array structure toward the other of said cell stack and said portion of said array structure.

7. The battery assembly as recited in claim 1, wherein said biased profile biases at least two battery cells of said cell stack into contact with said portion.

8. The battery assembly as recited in claim 1, wherein said first portion of said plurality of battery cells are displaced relative to said second portion of said plurality of battery cells to configure said cell stack in a chevron shape.

9. A battery assembly, comprising:
   an array structure; and
   a cell stack including a biased profile for biasing said cell stack and said array structure together, wherein said biased profile is adapted to progressively load said cell stack against said array structure in a direction from a mid-span of said cell stack outwardly as said cell stack is moved against said array structure.

* * * * *